(12) United States Patent
Natarajan et al.

(10) Patent No.: US 10,171,503 B1
(45) Date of Patent: Jan. 1, 2019

(54) METHODS FOR SCALING INFRASTRUCTURE IN A MOBILE APPLICATION ENVIRONMENT AND DEVICES THEREOF

(71) Applicant: F5 Networks, Inc., Seattle, WA (US)

(72) Inventors: Ravi Natarajan, Fremont, CA (US); Saxon Amdahl, Mountain View, CA (US)

(73) Assignee: F5 Networks, Inc., Seattle, WA (US)

( * ) Notice: Subject to any disclaimer, the term of this patent is extended or adjusted under 35 U.S.C. 154(b) by 0 days.

(21) Appl. No.: 14/800,244

(22) Filed: Jul. 15, 2015

Related U.S. Application Data

(60) Provisional application No. 62/024,972, filed on Jul. 15, 2014.

(51) Int. Cl.
*H04L 29/06* (2006.01)
*H04W 4/18* (2009.01)
*G06F 8/61* (2018.01)

(52) U.S. Cl.
CPC ............. *H04L 63/20* (2013.01); *G06F 8/61* (2013.01); *H04L 63/102* (2013.01); *H04W 4/18* (2013.01)

(58) Field of Classification Search
CPC ......... H04L 63/20; H04L 63/102; G06F 8/61; H04W 4/18
USPC .............................................................. 726/1
See application file for complete search history.

(56) References Cited

U.S. PATENT DOCUMENTS

| | | | |
|---|---|---|---|
| 6,856,414 B1 * | 2/2005 | Haneda | G06F 17/3028 358/1.15 |
| 7,877,482 B1 * | 1/2011 | Ashcraft | G06F 9/5022 709/226 |
| 8,644,506 B2 | 2/2014 | Zellner | |
| 9,690,925 B1 | 6/2017 | Banerjee | |
| 2005/0227218 A1 * | 10/2005 | Mehta | G09B 5/00 434/350 |
| 2005/0278642 A1 * | 12/2005 | Chang | G06Q 10/06 715/751 |
| 2008/0307100 A1 * | 12/2008 | Duggirala | H04L 29/06 709/228 |

(Continued)

OTHER PUBLICATIONS

F5 Networks Inc., "Big IP® Global Traffic Manager™: Implementations" F5 Networks Inc., Feb. 22, 2014, Version 11.4, pp. 1-106.

(Continued)

*Primary Examiner* — Matthew T Henning
(74) *Attorney, Agent, or Firm* — LeClairRyan PLLC

(57) ABSTRACT

A method, non-transitory computer readable medium and device that assists with scaling infrastructure in a mobile application environment obtaining a number of mobile application installations of a mobile application on a plurality of mobile devices. A number of mobile application installations corresponds with a number of backend enterprise web applications online on one or more web applications servers is determined where the backend enterprise web applications are associated with the mobile application. The number of backend enterprise web applications online on the one or more web application servers is modified when the determining indicates the number of mobile application installations does not correspond with the number of backend enterprise web applications.

25 Claims, 4 Drawing Sheets

(56) References Cited

U.S. PATENT DOCUMENTS

| | | | |
|---|---|---|---|
| 2009/0150970 A1* | 6/2009 | Hinds | G06F 21/88 |
| | | | 726/1 |
| 2011/0022962 A1* | 1/2011 | Luo | G06Q 10/10 |
| | | | 715/745 |
| 2011/0047075 A1 | 2/2011 | Fourez | |
| 2012/0174237 A1 | 7/2012 | Krzyzanowski | |
| 2013/0078949 A1 | 3/2013 | Pecen | |
| 2013/0130651 A1* | 5/2013 | Deasy | H04W 76/10 |
| | | | 455/411 |
| 2013/0175259 A1 | 6/2013 | Brosnan et al. | |
| 2013/0197998 A1 | 8/2013 | Buhrmann | |
| 2013/0288692 A1 | 10/2013 | Dupray | |
| 2013/0290407 A1* | 10/2013 | Maiya | G06Q 40/02 |
| | | | 709/203 |
| 2014/0059695 A1 | 2/2014 | Parecki | |
| 2014/0108649 A1* | 4/2014 | Barton | G06F 9/45533 |
| | | | 709/224 |
| 2014/0007117 A1 | 6/2014 | Sima et al. | |
| 2014/0162693 A1 | 6/2014 | Wachter | |
| 2014/0245379 A1* | 8/2014 | Oberheide | G06F 21/34 |
| | | | 726/1 |
| 2014/0331317 A1 | 11/2014 | Singh | |
| 2015/0006710 A1* | 1/2015 | Sauerwald | H04L 67/125 |
| | | | 709/224 |
| 2015/0032621 A1 | 1/2015 | Kar | |
| 2015/0040246 A1* | 2/2015 | Yuen | H04L 63/168 |
| | | | 726/30 |
| 2015/0120572 A1 | 4/2015 | Slade | |
| 2015/0227934 A1 | 8/2015 | Chauhan | |
| 2015/0288661 A1* | 10/2015 | Monk | H04L 63/0281 |
| | | | 726/7 |

OTHER PUBLICATIONS

F5 Networks Inc., "BIG-IP® TMOS®: Implementations" F5 Networks Inc., May 5, 2015, Version 11.4, pp. 1-234.

F5 Networks Inc. "F5 BIG-IP Access Policy Manager Operations Guide 1.0" F5 Networks Inc., May 3, 2015, pp. 1-122.

F5 Networks Inc., "BIG IP® Global Traffic Manager™: Implementations" F5 Networks Inc., Nov. 19, 2014, Version 11.4, pp. 1-234.

Sundberg J., "Mobile Application Management (MAM)", Technical Article, F5 Network, Inc., Feb. 21, 2013.

* cited by examiner

METHODS FOR SCALING INFRASTRUCTURE IN A MOBILE APPLICATION ENVIRONMENT AND DEVICES THEREOF

This application claims the benefit of U.S. Provisional Patent Application Ser. No. 62/024,972 filed on Jul. 15, 2014, which is hereby incorporated by reference in its entirety.

FIELD

This technology generally relates to methods and devices for network traffic management and, more particularly, to methods for scaling infrastructure in a mobile application environment and devices thereof.

BACKGROUND

Mobile network environments within an organization continue to grow and expand at a rapid rate. Within these mobile network environments, a variety of different mobile computing device have been requesting access to an increasing number of different resources, such as backend applications. Additionally, these access requests from mobile computing devices often are received at different times, the requested resources are utilized for varying periods of time, and the requested resources often have different established access policies which need to be enforced. Unfortunately, prior mobile network environments have not been effective or efficient with managing and/or appropriately scaling their mobile application infrastructure to meet these challenges.

SUMMARY

A method for scaling infrastructure in a mobile application environment includes obtaining, by an access policy management device, a number of mobile application installations of a mobile application on a plurality of mobile devices. A number of mobile application installations corresponds with a number of backend enterprise web applications online on one or more web applications servers is determined by the access policy management computing device where the backend enterprise web applications are associated with the mobile application. The number of backend enterprise web applications online on the one or more web application servers is modified by the access policy management computing device when the determining indicates the number of mobile application installations does not correspond with the number of backend enterprise web applications.

A non-transitory computer readable medium having stored thereon instructions for scaling infrastructure in a mobile application environment comprising machine executable code which when executed by at least one processor, causes the processor to perform steps includes obtaining a number of mobile application installations of a mobile application on a plurality of mobile devices. A number of mobile application installations corresponds with a number of backend enterprise web applications online on one or more web applications servers is determined where the backend enterprise web applications are associated with the mobile application. The number of backend enterprise web applications online on the one or more web application servers is modified when the determining indicates the number of mobile application installations does not correspond with the number of backend enterprise web applications.

An access policy management computing device including at least one of configurable hardware logic configured to be capable to implement or a memory, wherein the memory is coupled to one or more processors which are configured to be capable of executing programmed instructions, which comprise programmed instructions stored in the memory to obtain a number of mobile application installations of a mobile application on a plurality of mobile devices. A number of mobile application installations corresponds with a number of backend enterprise web applications online on one or more web applications servers is determined where the backend enterprise web applications are associated with the mobile application. The number of backend enterprise web applications online on the one or more web application servers is modified when the determining indicates the number of mobile application installations does not correspond with the number of backend enterprise web applications.

This technology provides a number of advantages including providing a method, non-transitory computer readable medium and apparatus that assists with method for scaling infrastructure in a mobile application environment. With this technology, changes in mobile application installations on mobile devices can be monitored by the access policy management computing device through communication with the mobile application manager computing device. Based on the monitoring, a number of backend enterprise web applications executed by web application server(s) or currently online can be modified, thereby dynamically scaling the application infrastructure. Accordingly, with this technology instances of backend enterprise web applications can be efficiently brought online and taken offline in response to changes in the deployment of corresponding mobile applications for enrolled mobile devices.

DETAILED DESCRIPTION

Figure 1:
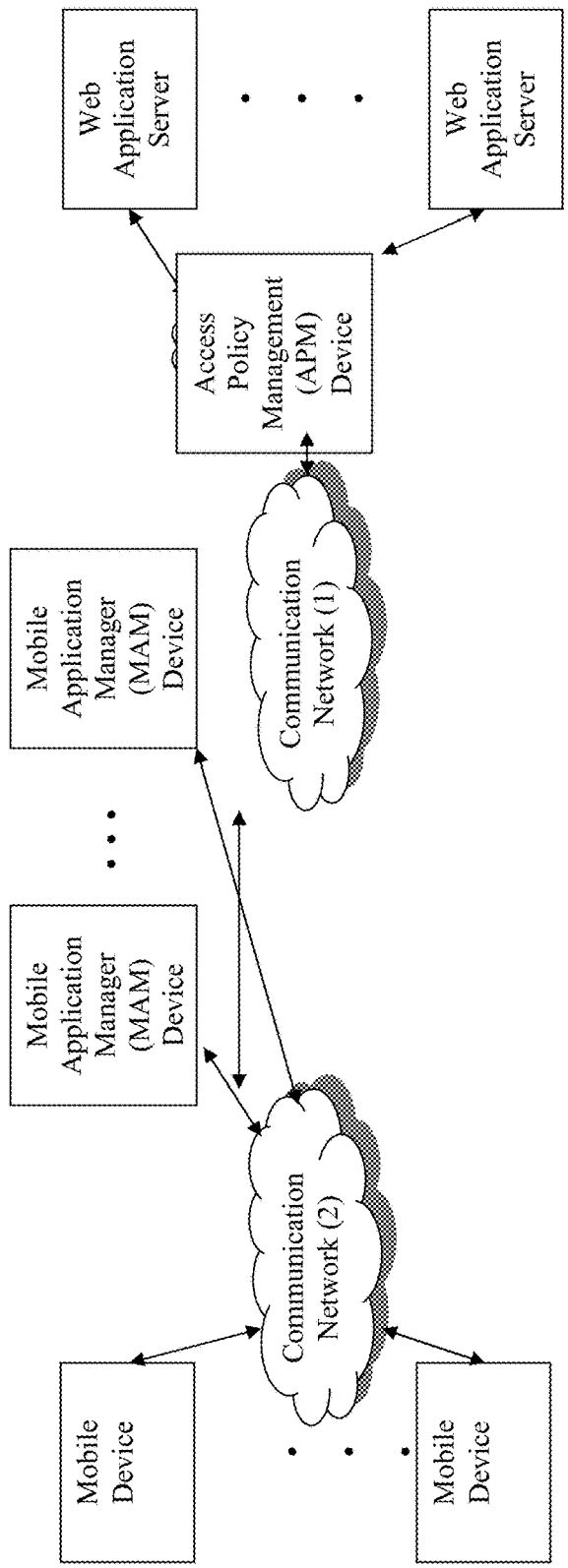
FIG. 1 is an example of a block diagram of an environment including a access policy management computing device for scaling infrastructure in a mobile application environment.
Figure 2:
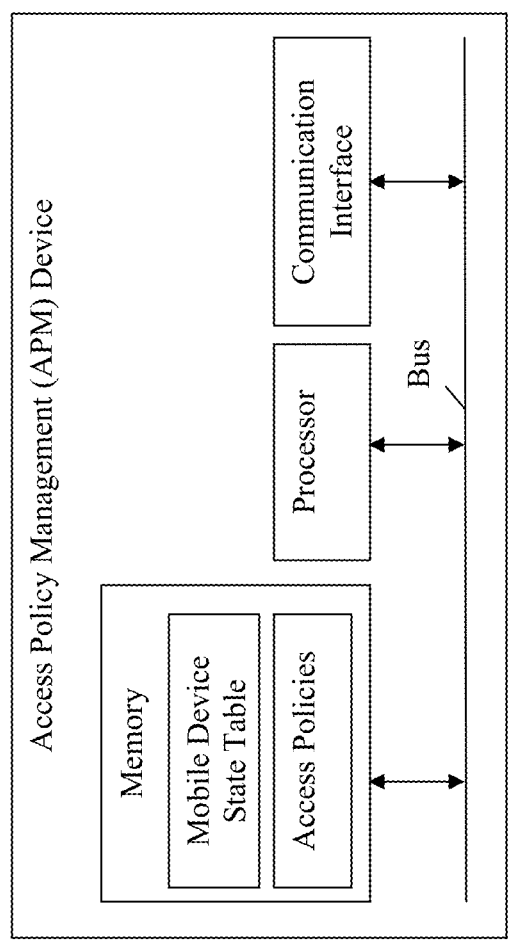
FIG. 2 is an example of a block diagram of an access policy management computing device.

An example of a network environment 10 with an access policy management computing device 14 for scaling infrastructure in a mobile application environment is illustrated in FIGS. 1 and 2. The exemplary environment 10 includes a plurality of mobile computing devices 12(1)-12(n), a plurality of mobile application manager computing devices 13(1)-13(n), an access policy management computing device 14, and a plurality of web application servers 16(1)-16(n) which are coupled together by a plurality of communication networks 30(1)-30(2), although the environment can include other types and numbers of systems, devices, components, and/or elements and in other topologies and deployments. While not shown, the exemplary environment 10 may include additional network components, such as routers, switches and other devices, which are well known to those of ordinary skill in the art and thus will not be described here. This technology provides a number of advantages including providing a method, non-transitory computer readable medium and apparatus that that assists with method for scaling infrastructure in a mobile application environment.

Referring more specifically to FIGS. 1 and 2, the access policy management computing device 14 is coupled to the plurality of mobile computing devices 12(1)-12(n) through the communication networks 30(1)-30(2), although the plurality of mobile computing devices 12(1)-12(n) and access policy management computing device 14 may be coupled together via other topologies. Additionally, the access policy management computing device 14 is coupled to the plurality of mobile application manager devices 13(1)-13(n) through the communication networks 30(1)-30(2), although the plurality of mobile application manager devices 13(1)-13(n) and access policy management computing device 14 may be coupled together via other topologies such as only through communication network 30(1).

The access policy management computing device 14 assists with scaling infrastructure in a mobile application environment as illustrated and described by way of the examples herein, although access policy management computing device 14 may perform other types and/or numbers of functions. As illustrated in FIG. 2, the access policy management computing device 14 may include a processor or central processing unit (CPU) 18, a memory 20, optional configurable hardware logic 21, and a communication interface 24 which are coupled together by a bus 26, although the access policy management computing device 14 may comprise other types and numbers of elements in other configurations. Additionally, as illustrated in FIG. 2, the memory 20 of the access policy management computing device 14 includes a mobile device state table 25 and access policies 26, although the memory 20 can include other types or amounts of information. In this example, the memory includes a mobile device state table and access policies. The access policies 26 are established by an administrator and enforced by the access policy management computing device 14 to restrict access by users of the plurality of mobile devices 12(1)-12(n) to backend enterprise web applications hosted by the plurality of web application servers 16(1)-16(n). The mobile device state table 25 includes entries with state information obtained from the plurality of mobile application manager computing devices 13(1)-13(n) including at least an indication of the mobile applications that are installed on each of the plurality of mobile computing devices 12(1)-12(n) enrolled with the plurality of mobile application manger computing devices 13(1)-13(n). Additionally in this example, the bus 26 is a hyper-transport bus in this example, although other bus types and links may be used, such as PCI.

The processor 18 within the access policy management computing device 14 may execute one or more computer-executable instructions stored in the memory 20 for the methods illustrated and described with reference to the examples herein, although the processor can execute other types and numbers of instructions and perform other types and numbers of operations. The processor 18 may comprise one or more central processing units ("CPUs") or general purpose processors with one or more processing cores, such as AMD® processor(s), although other types of processor(s) could be used (e.g., Intel®).

Memory 20 within the access policy management computing device 14 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. The memory 20 may store one or more non-transitory computer-readable instructions of this technology as illustrated and described with reference to the examples herein that may be executed by the processor 18. The exemplary flowcharts shown in FIGS. 3 and 4 and the exemplary sequence flow diagrams shown in FIG. 5 are representative of example steps or actions of this technology that may be embodied or expressed as one or more non-transitory computer or machine readable instructions stored in memory 20 that may be executed by the processor 18 and/or may be implemented by configured logic in the optional configurable logic 21.

The optional configurable hardware logic 21 in the access policy management computing device 14 may comprise specialized hardware configured to implement one or more steps of this technology as illustrated and described with reference to the examples herein. By way of example only, the optional configurable logic hardware device 21 may comprise one or more of field programmable gate arrays ("FPGAs"), field programmable logic devices ("FPLDs"), application specific integrated circuits (ASICs") and/or programmable logic units ("PLUs").

The communication interface 24 in the access policy management computing device 14 is used to operatively couple and communicate between the access policy management computing device 14, the plurality of mobile computing devices 12(1)-12(n), the plurality of mobile application manger computing devices 13(1)-13(n) and the plurality of web application servers 16(1)-16(n) which are all coupled together by communication networks 30(1)-30(n) such as one or more local area networks (LAN) and/or the wide area network (WAN), although other types and numbers of communication networks or systems with other types and numbers of connections and configurations to other devices and elements. By way of example only, the communication network such as local area networks (LAN) and the wide area network (WAN) can use TCP/IP over Ethernet and industry-standard protocols, including NFS, CIFS, SOAP, XML, LDAP, and SNMP, although other types and numbers of communication networks, can be used. In this example, the bus 26 is a hyper-transport bus in this example, although other bus types and links may be used, such as PCI.

Each of the plurality of mobile computing devices 12(1)-12(n), include a central processing unit (CPU) or processor, a memory, input/display device interface, configurable logic device and an input/output system or I/O system, which are coupled together by a bus or other link. The plurality of mobile computing devices 12(1)-12(n), in this example, may run interface mobile applications, such as Web browsers, that may provide an interface to make requests for and send and/or receive data to and/or from the plurality of web application servers 16(1)-16(n) via the access policy management computing device 14 or may run one or more network administration related applications to manage the network, although other types of application may also run on the plurality of mobile computing devices 12(1)-12(n). Each of the plurality of mobile computing devices 12(1)-12(n) utilizes the access policy management computing device 14 to conduct one or more operations with the plurality of web application servers 16(1)-16(n), such as to obtain data from one of the plurality of web application servers 16(1)-16(n), request an application to be retrieved from the plurality of web application servers 16(1)-16(n) or manage network administration using one or more mobile applications executing on the plurality of mobile computing devices 12(1)-12(n), by way of example only, although other numbers and/or types of systems could be utilizing these resources and other types and numbers of functions utilizing other types of protocols could be performed.

Each of the plurality of mobile application manager computing devices 13(1)-13(n) includes a processor, a memory, and a communication interface which are coupled together by a bus, although each of the plurality of mobile application manager computing devices 13(1)-13(n) may include other types and numbers of elements in other configurations. By way of example only, each of the plurality of mobile application manager computing devices 13(1)-13(n) may perform any type and/or number of functions or operations including enforcing access policies on the plurality of mobile computing devices 12(1)-12(n) by way of example only, although each of the mobile application manager computing devices 13(1)-13(n) can perform other types and/or numbers of other functions and/or operations.

Each of the plurality of web application servers 16(1)-16(n) include a central processing unit (CPU) or processor, a memory, and a communication system, which are coupled together by a bus or other link, although other numbers and/or types of network devices could be used. Generally, the plurality of web application servers 16(1)-16(n) process requests for providing access to one or more enterprise web applications received from the plurality of mobile computing devices 12(1)-12(n) via the communication network 30 according to the HTTP-based application RFC protocol or the CIFS or NFS protocol in this example, but the principles discussed herein are not limited to this example and can include other application protocols. A series of applications may run on the plurality servers 16(1)-16(n) that allows the transmission of applications requested by the plurality of mobile computing devices 12(1)-12(n) or the access policy management computing device 14. The plurality of web application servers 16(1)-16(n) may provide data or receive data in response to requests directed toward the respective applications on the plurality of web application servers 16(1)-16(n) from the plurality of mobile computing devices 12(1)-12(n) or the access policy management computing device 14. It is to be understood that the plurality of web application servers 16(1)-16(n) may be hardware or software or may represent a system with multiple external resource servers, which may include internal or external networks. In this example the plurality of web application servers 16(1)-16(n) may be any version of Microsoft® IIS servers or Apache® servers, although other types of servers may be used.

Although an exemplary environment 10 with the plurality of mobile computing devices 12(1)-12(n), the plurality of mobile application manager computing devices 13(1)-13(n), the access policy management computing device 14, and the plurality of web application servers 16(1)-16(n), communication networks 30 are described and illustrated herein, other types and numbers of systems, devices, blades, components, and elements in other topologies can be used. It is to be understood that the systems of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

Figure 3:
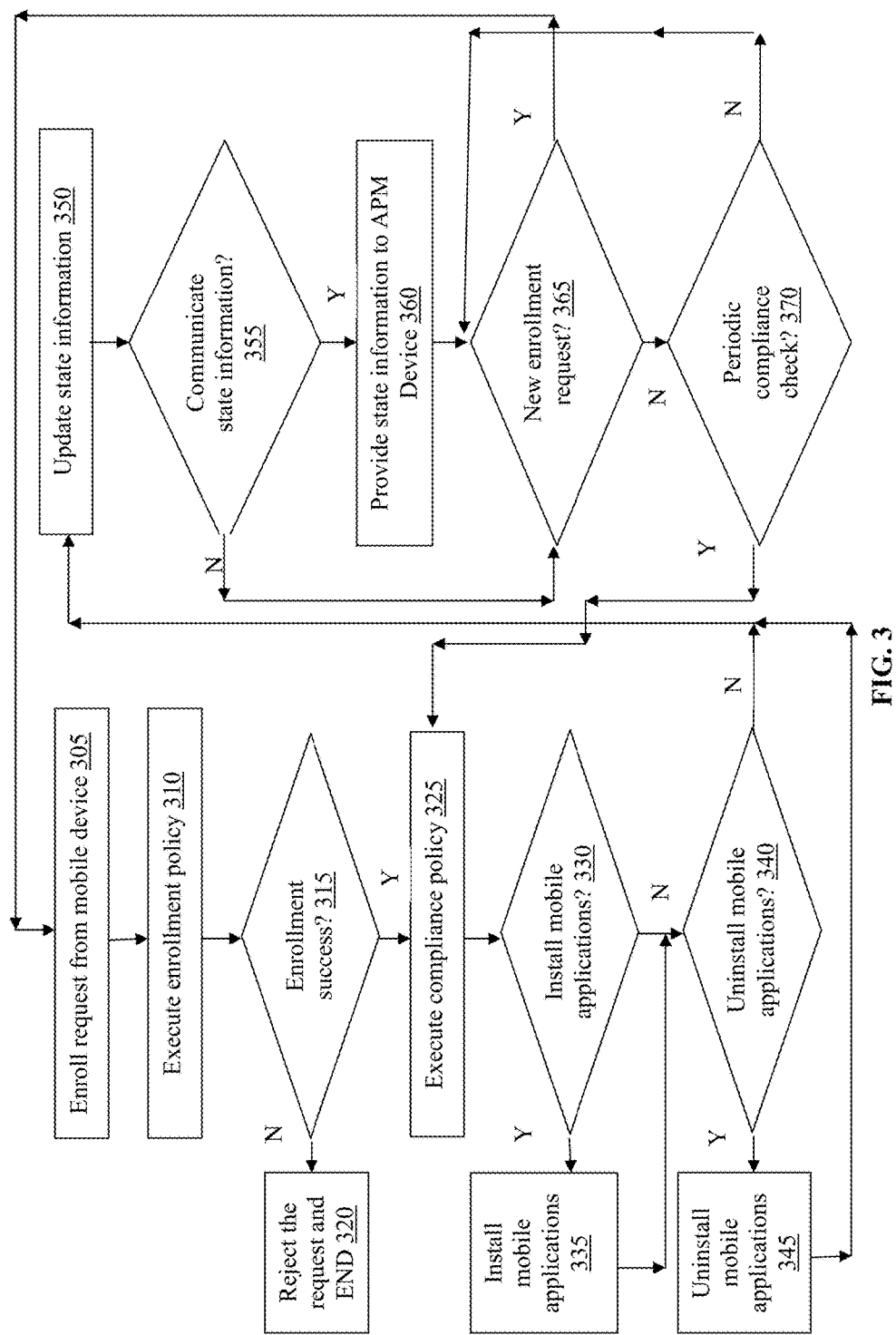
FIG. 3 is an exemplary flowchart of a method for enrolling a mobile computing device.
Figure 4:
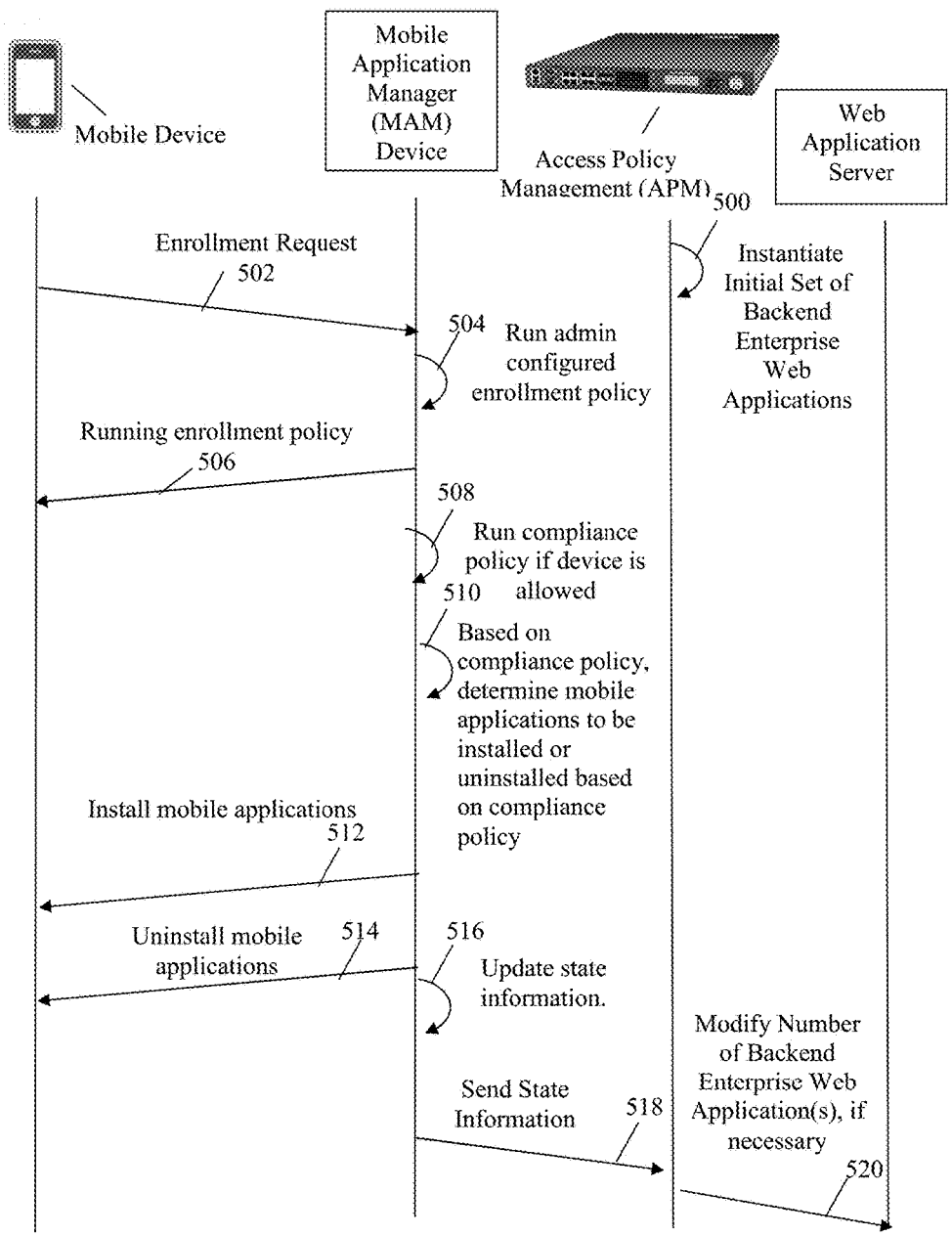
FIG. 4 is an exemplary sequence flow diagram for scaling infrastructure in a mobile application environment.

An exemplary method of scaling infrastructure in a mobile application environment will now be described with reference to FIGS. 1-4. Referring more specifically to FIGS. 3 and 4, an exemplary method for maintaining and providing state information by the MAM device is shown. In step 305 in this example, one of the plurality of the mobile application manager computing devices 13(1)-13(n) enrolls and/or de-enrolls one or more of the plurality of mobile computing devices 12(1)-12(n) and updates state information stored by one of the plurality of mobile application manager computing devices 13(1)-13(n) accordingly. In this example, one of the plurality of mobile application manager computing devices 13(1)-13(n) can receive an enrollment request from one of the plurality of mobile computing devices 12(1)-12(n) including user credentials of the user of the requesting one of the plurality of mobile computing devices 12(1)-12(n), although one of the plurality of mobile application manager computing devices 13(1)-13(n) can receive other types of information from the requesting one of the plurality of mobile computing devices 12(1)-12(n), such as the type of the requesting mobile device, user group information associated with the user of the requesting mobile device, geographic location of the mobile device and/or the IP address of the mobile device, for example.

Next in step 310, one of the plurality of mobile application manager computing devices 13(1)-13(n) executes an enrollment policy on the requesting one of the plurality of mobile computing devices 12(1)-12(n). In this example, the enrollment policy includes rules that assist the one of the plurality of mobile application manager computing devices 13(1)-13(n) to determine when the requesting one of the plurality of mobile computing devices 12(1)-12(n) is allowed to be enrolled, although the enrollment policy can include other types or amounts of information. By way of example only, the enrollment policy can include the guidelines to check for the user credentials and other information associated with the requesting mobile device.

Accordingly in step 315, when one of the plurality of mobile application manager computing devices 13(1)-13(n) determines that the user credentials and the other types of information received from the requesting one of the plurality of mobile computing devices 12(1)-12(n) are not in compliance with the enrollment policy, then the No branch is taken to step 320. In step 320, one of the plurality of mobile application manager computing devices 13(1)-13(n) can reject the request for enrollment and this example of the method ends.

However, when one of the plurality of mobile application manager computing devices 13(1)-13(n) determines that the user credentials and the other types of information received from the requesting one of the plurality of mobile computing devices 12(1)-12(n) are in compliance with the enrollment policy, then the Yes branch is taken to step 325.

In step 325, one of the plurality of mobile application manager computing devices 13(1)-13(n) executes an administrator configured compliance policy on the requesting one of the plurality of mobile computing devices 12(1)-12(n). In this example, the compliance policy checks the device settings, user settings and the mobile applications or security policies installed or executing with the requesting one of the plurality of mobile computing devices 12(1)-12(n), although the compliance policy can perform other types or amounts checks on the enrolled mobile device.

Next in step 330, based on the compliance policy, one of the plurality of mobile application manager computing devices 13(1)-13(n) determines when mobile application(s) are required to be installed on the requesting one of the plurality of mobile computing devices 12(1)-12(n). By way of example only, if the compliance policy requires five mobile security applications on the requesting one of the plurality of mobile computing devices 12(1)-12(n) and only four are installed on the requesting one of the plurality of mobile computing devices 12(1)-12(n), then one of the plurality of mobile application manager computing devices 13(1)-13(n) determines that a mobile application is required to be installed. Accordingly, when one of the plurality of mobile application manager computing devices 13(1)-13(n) determines that mobile application is required to be installed, then the Yes branch is taken to step 335.

In step 335, one of the plurality of mobile application manager computing devices 13(1)-13(n) proceeds to install the mobile application to be in compliance with the compliance policy. However back in step 330, when one of the plurality of mobile application manager computing devices 13(1)-13(n) determines that the mobile application is not required to be installed, then the No branch is taken to step 340.

Next in step 340, one of the plurality of mobile application manager computing devices 13(1)-13(n) determines when mobile application(s) are required to be uninstalled from the requesting one of the plurality of mobile computing devices 12(1)-12(n). By way of example only, if the compliance policy requires five mobile security applications to be executing on the requesting one of the plurality of mobile computing devices 12(1)-12(n) and there are six mobile security applications executing on the requesting one of the plurality of mobile computing devices 12(1)-12(n), then one of the plurality of mobile application manager computing devices 13(1)-13(n) proceeds to uninstall one of the mobile security applications to be in compliant with the compliance policy. Alternatively, the one of the plurality of mobile application manager computing devices 13(1)-13(n) can uninstall one of the mobile security application(s) based on the administrator configured compliance policy. Accordingly, when one of the plurality of mobile application manager computing devices 13(1)-13(n) determines that the mobile application is not required to be uninstalled, then the No branch is taken to step 350 which will be further illustrated below. However, when one of the plurality of mobile application manager computing devices 13(1)-13(n) determines that mobile application(s) is required to be uninstalled, then the Yes branch is taken to step 345. In step 345, one of the plurality of mobile application manager computing devices 13(1)-13(n) uninstalls the mobile application(s) on the requesting one of the plurality of and then proceeds to the next step.

Next in step 350, one of the plurality of mobile application manager computing devices 13(1)-13(n) updates the state information based on the changes made on the requesting one of the plurality of mobile computing devices 12(1)-12(n) to be in compliant with the compliance policy and stores the updated state information within the memory of the one of the plurality of mobile application manager computing devices 13(1)-13(n), although one of the plurality of mobile application manager computing devices 13(1)-13(n) can store the state information at other memory locations.

Next in step 355, one of the plurality of mobile application manager computing devices 13(1)-13(n) determines when the updated state information is required to be communicated to the access policy management computing device 14. By way of example only, one of the plurality of mobile application manager computing devices 13(1)-13(n) compares the number of updates in the state information with a stored threshold number of updates to the state information. When the number of updates to the state information is less than the stored threshold number of updates to the state information, then the No branch is taken to step 365 which will be further illustrated below.

However, when the number of updates to the state information is greater or equal to the stored threshold number of updates to the state information, then the Yes branch is taken to step 360.

In step 360, one of the plurality of mobile application manager computing devices 13(1)-13(n) proceeds to provide the updated state information to the access policy management computing device 14. Alternatively, the one of the plurality of mobile application manager computing devices 13(1)-13(n) provides at least a subset of the state information stored in the memory to the access policy management computing device 14. In some examples, the state information can optionally include only an updated state for the one or more of the enrolled mobile devices for which a mobile application was installed or uninstalled since state information was previously provided to the access policy management computing device 14. In these examples, one of the plurality of mobile application manager computing devices 13(1)-13(n) can also provide an indication of any of the plurality of mobile computing devices 12(1)-12(n) that are newly enrolled or de-enrolled since state information was previously provided to the access policy management computing device 14. The state information includes at least an indication of the installed mobile applications for each of the plurality of mobile computing devices 12(1)-12(n) currently enrolled with one of the plurality of mobile application manager computing devices 13(1)-13(n), or for which state information is provided. In other examples, the state information further includes which installed applications are active (e.g., currently executing on each of the mobile devices) or recently active.

In one example, one of the plurality of mobile application manager computing devices 13(1)-13(n) determines that communication of state information should be initiated whenever the state of one of the plurality of mobile computing devices 12(1)-12(n) has changed (e.g., a mobile application has been installed or uninstalled). In another example, one of the plurality of mobile application manager computing devices 13(1)-13(n) determines that communication of state information should be initiated when a request for updated state information has been received from the access policy management computing device 14. In yet another example, the access policy management computing device 14 determines that communication of state information should be initiated when a specified time period has expired, although one of the plurality of mobile application manager computing devices 13(1)-13(n) can also determine that communication of state information should be initiated based on other criteria.

Next in step 365, one of the plurality of mobile application manager computing devices 13(1)-13(n) waits for the next enrollment request or the compliance check request to initiate this example of the method again. In this example, one of the plurality of mobile application manager computing devices 13(1)-13(n) waits until a certain duration to receive the next enrollment request. When one of the plurality of mobile application manager computing devices 13(1)-13(n) does not receive the next enrollment request, then the No branch is taken to step 370 which will be further illustrated below. However, when one of the plurality of mobile application manager computing devices 13(1)-13(n) receives the new enrollment request, then the Yes branch is taken back to step 305.

Next in step 370, one of the plurality of mobile application manager computing devices 13(1)-13(n) determines when it is time to perform a periodic compliance check is triggered. When one of the plurality of mobile application manager computing devices 13(1)-13(n) determines that the time to perform the periodic compliance check is triggered, then the Yes branch is taken to step 325 to execute the compliance policy. However, when one of the plurality of mobile application manager computing devices 13(1)-13(n) determines that the time to perform the periodic compliance check is not yet triggered, then the No branch is taken back to step 365. During the compliance check in this example, one of the plurality of mobile application manager computing devices 13(1)-13(n) requests and receives state information including at least an indication of the installed mobile applications from the enrolled one of the plurality of mobile computing devices 12(1)-12(n) and stores the state information in the memory of one of the plurality of mobile application manager computing devices 13(1)-13(n), although the one of the plurality of mobile application manager computing devices 13(1)-13(n) can store other types of information associated with the enrolled one of the plurality of mobile computing devices 12(1)-12(n) at other memory locations. Alternatively, the compliance check can also be initiated by the mobile user of the enrolled one of the plurality of mobile computing devices 12(1)-12(n). In this example, every time a compliance check is executed on the enrolled one of the plurality of mobile computing devices 12(1)-12(n) by one of the plurality of mobile application manager computing devices 13(1)-13(n), one or more mobile applications are installed or uninstalled based on the change of status of the enrolled one of the plurality of mobile computing devices 12(1)-12(n).

Accordingly, with this technology changes in mobile application installations on mobile devices can be monitored by the access policy management computing device 14 through communication with the plurality of mobile application manager computing devices 13(1)-13(n). Based on the monitoring, a number of backend enterprise web applications executed by web application server(s) or currently online can be modified, thereby dynamically scaling the application infrastructure. Further, with this technology instances of backend enterprise web applications can be brought online and taken offline relatively efficiently in response to changes in the deployment of corresponding mobile applications for enrolled mobile devices.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for scaling infrastructure in a mobile application environment, the method implemented by a network traffic management system comprising one or more network traffic apparatuses, client devices, or server devices, and the method comprising:
   executing a compliance policy with respect to a plurality of mobile devices;
   selecting a mobile application to be updated based on the compliance policy;
   updating state information based on the selection of the mobile application to be updated;
   obtaining a number of updates of the mobile application selected to be updated on the plurality of mobile devices using the updated state information;
   determining a number of mobile application updates reaches an update threshold; and
   modifying a number of backend enterprise web applications executing on one or more web application servers that service the updated mobile application based on the number of mobile application updates reaching the update threshold.

2. The method of claim 1, wherein the mobile devices are currently enrolled with a mobile application manager device and the number of mobile application installations of the mobile application is obtained from the mobile application manager device.

3. The method of claim 2, wherein the obtaining further comprises retrieving the updated state information for each of the mobile devices, the current state comprising an indication of when the mobile application is installed or uninstalled, or when the mobile application is currently active or recently active.

4. The method of claim 2, wherein the number of mobile application installations of the mobile application on the mobile devices is obtained in response to an update at the mobile application manager device of a state for at least one of the mobile devices.

5. The method of claim 1, further comprising repeating the executing, the selecting, the updating, the obtaining, the determining and the modifying steps for each of a plurality of other mobile applications.

6. The method of claim 1, wherein the determining the number of mobile application updates reaches an update threshold further comprises, determining that a difference between a first number of mobile application updates and a second number of mobile application updates, each obtained at a different time period, reaches the update threshold, wherein the number of mobile application updates is obtained periodically.

7. The method as set forth in claim 1 further comprising:
determining, by the network traffic manager apparatus, when the number of mobile application installations corresponds with a number of backend enterprise web applications online on one or more web applications servers, wherein the backend enterprise web applications are associated with the mobile application; and
modifying, by the network traffic manager apparatus, the number of backend enterprise web applications online on the one or more web application servers, when the determining indicates the number of mobile application installations does not correspond with the number of backend enterprise web applications.

8. The method as set forth in claim 1 wherein the modifying further comprises:
adding one or more instances of a backend enterprise web application executing on the one or more web application servers; or
removing the one or more instances of the backend enterprise web application executing on the one or more web application servers.

9. A network traffic manager apparatus, comprising memory comprising programmed instructions stored in the memory and one or more processors configured to be capable of executing the programmed instructions stored in the memory to:
execute a compliance policy with respect to a plurality of mobile devices;
select a mobile application to be updated based on the compliance policy;
update state information based on the selection of the mobile application to be updated;
obtain a number of updates of the mobile application selected to be updated on the plurality of mobile devices using the updated state information;
determine a number of mobile application updates reaches an update threshold; and
modify a number of backend enterprise web applications executing on one or more web application servers that service the updated mobile application based on the number of mobile application updates reaching the update threshold.

10. The apparatus of claim 9, wherein the mobile devices are currently enrolled with a mobile application manager device and wherein the one or more processors are further configured to be capable of executing the programmed instructions stored in the memory to obtain the number of mobile application installations of the mobile application from the mobile application manager device.

11. The apparatus of claim 10, wherein the one or more processors are further configured to be capable of executing the programmed instructions stored in the memory to retrieve from the mobile application manager device an updated state information for each of the mobile devices, the current state comprising an indication of whether the mobile application is installed or uninstalled, or when the mobile application is currently active or recently active.

12. The apparatus of claim 10, wherein the number of mobile application installations of the mobile application on the mobile devices is obtained in response to an update at the mobile application manager device of a state for at least one of the mobile devices.

13. The apparatus of claim 9, wherein the one or more processors are further configured to be capable of executing the programmed instructions stored in the memory to repeat the executing, the selecting, the updating, the obtaining, the determining and the modifying steps for each of a plurality of other mobile applications.

14. The apparatus of claim 9, wherein the one or more processors are further configured to be capable of executing the programmed instructions stored in the memory wherein the determining the number of mobile application updates reaches an update threshold further comprises, determine that a difference between a first number of mobile application updates and a second number of mobile application updates, each obtained at a different time period, reaches the update threshold, wherein the number of mobile application updates is obtained periodically.

15. The apparatus of claim 9, wherein the one or more processors are further configured to be capable of executing the programmed instructions stored in the memory wherein the determining and for the modifying further comprising and stored in the memory to:
determine when the number of mobile application installations corresponds with a number of backend enterprise web applications online on one or more web applications servers, wherein the backend enterprise web applications are associated with the mobile application; and
modify the number of backend enterprise web applications online on the one or more web application servers, when the determining indicates the number of mobile application installations does not correspond with the number of backend enterprise web applications.

16. The apparatus as set forth in claim 9, wherein the one or more processors are further configured to be capable of executing the programmed instructions stored in the memory wherein the determining and for the modifying further comprising and stored in the memory wherein the modifying further comprises:
add one or more instances of a backend enterprise web application executing on the one or more web application servers; or
remove the one or more instances of the backend enterprise web application executing on the one or more web application servers.

17. A non-transitory computer readable medium having stored thereon instructions for scaling infrastructure in a mobile application environment comprising machine executable code which when executed by a processor, causes the processor to:
execute a compliance policy with respect to a plurality of mobile devices;
select a mobile application to be updated based on the compliance policy;
update state information based on the selection of the mobile application to be updated;
obtain a number of updates of the mobile application selected to be updated on the plurality of mobile devices using the updated state information;
determine a number of mobile application updates reaches an update threshold; and
modify a number of backend enterprise web applications executing on one or more web application servers that service the updated mobile application based on the number of mobile application updates reaching the update threshold.

18. The medium of claim 17, wherein the mobile devices are currently enrolled with a mobile application manager device and the number of mobile application installations of the mobile application is obtained from the mobile application manager device.

19. The medium of claim 18, wherein the obtaining further comprises retrieve from the mobile application manager device an updated state information for each of the mobile devices, the current state comprising an indication of whether the mobile application is installed or uninstalled, or when the mobile application is currently active or recently active.

20. The medium of claim 18, wherein the number of mobile application installations of the mobile application on the mobile devices is obtained in response to an update at the mobile application manager device of a state for at least one of the mobile devices.

21. The medium of claim 17, further comprising repeat the executing, the selecting, the updating, the obtaining, the determining and the modifying steps for each of a plurality of other mobile applications.

22. The medium of claim 17, wherein the determining the number of mobile application updates reaches an update threshold further comprises, determine that a difference between a first number of mobile application updates and a second number of mobile application updates, each obtained at a different time period, reaches the update threshold, wherein the number of mobile application updates is obtained periodically.

23. The medium as set forth in claim 17 further comprising:
   determine when the number of mobile application installations corresponds with a number of backend enterprise web applications online on one or more web applications servers, wherein the backend enterprise web applications are associated with the mobile application; and
   modify the number of backend enterprise web applications online on the one or more web application servers, when the determining indicates the number of mobile application installations does not correspond with the number of backend enterprise web applications.

24. The medium as set forth in claim 17 wherein the modifying further comprises:
   adding one or more instances of a backend enterprise web application executing on the one or more web application servers; or
   removing the one or more instances of the backend enterprise web application executing on the one or more web application servers.

25. A network traffic management system, comprising one or more traffic management apparatuses, client devices, or server devices, the network traffic management system comprising memory comprising programmed instructions stored thereon and one or more processors configured to be capable of executing the stored programmed instructions to:
   execute a compliance policy with respect to a plurality of mobile devices;
   select a mobile application to be updated based on the compliance policy;
   update state information based on the selection of the mobile application to be updated;
   obtain a number of updates of the mobile application selected to be updated on the plurality of mobile devices using the updated state information;
   determine a number of mobile application updates reaches an update threshold; and
   modify a number of backend enterprise web applications executing on one or more web application servers that service the updated mobile application based on the number of mobile application updates reaching the update threshold.

* * * * *